W. F. OTHER.
COMBINED LICENSE PLATE AND TAIL LIGHT.
APPLICATION FILED MAY 31, 1916.
1,386,018. Patented Aug. 2, 1921.
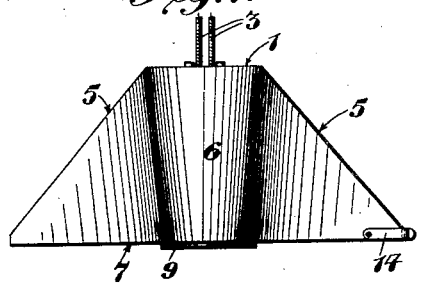
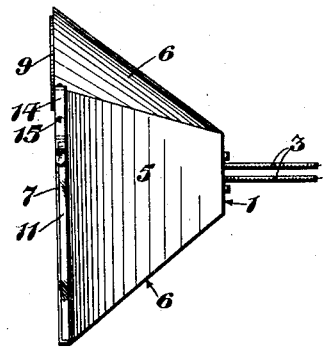
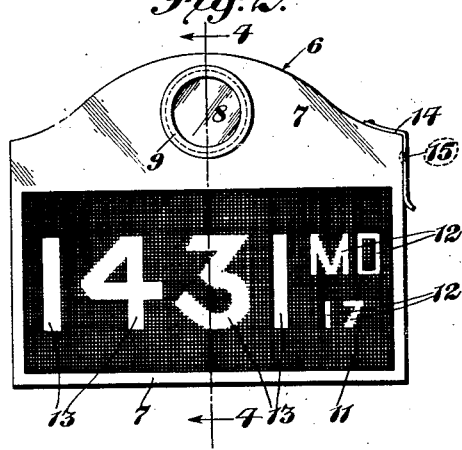
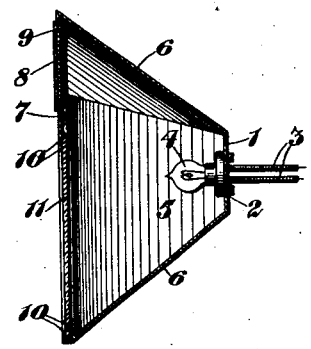
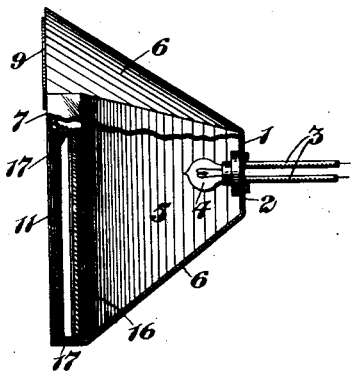
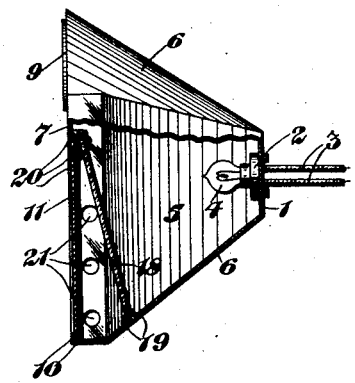

UNITED STATES PATENT OFFICE.

WILLIAM F. OTHER, OF ST. LOUIS, MISSOURI.

COMBINED LICENSE-PLATE AND TAIL-LIGHT.

1,386,018.  Specification of Letters Patent.  Patented Aug. 2, 1921

Application filed May 31, 1916. Serial No. 100,767.

*To all whom it may concern:*

Be it known that I, WILLIAM F. OTHER, a citizen of the United States, residing at the city of St. Louis and State of Missouri, have invented a new and useful Combined License-Plate and Tail-Light, of which the following is a specification.

This invention relates to a combined license plate and tail light for automobiles. An object of the invention is to provide an improved license plate and tail light comprising a supporting case having a glass plate in proper position in one wall thereof to serve as the tail light and having a non-combustible opaque plate having the license number or symbol formed on integral translucent portions thereof, so that the same lamp serves the tail light and also illuminates the improved license plate.

Another object of the invention is to provide a combined license plate and tail light comprising a case arranged to serve as a support for the lamp, the tail light plate and the license plate having the lamp mounted therein and the tail light plate mounted in one wall thereof, in combination with an opaque license plate having the license number or symbol formed on integral translucent portions thereof, in combination with a transparent plate supported within the case between the license plate and the lamp, and means for admitting cooling currents of air between the license plate and the transparent plate.

Another object of the invention is to provide a combined license plate and tail light comprising a case for supporting the lamp, the tail light and license plate, and having the lamp mounted within the case and the tail light plate mounted in one wall of the case, in combination with an opaque license plate having the license number or symbol formed on integral translucent portions thereof, and a transparent plate mounted in the case between the license plate and the lamp.

Other objects and advantages will appear from the following detailed description and do not require specific mention.

In the accompanying drawing, in which I have illustrated my invention,

Figure 1 is a plan view of one embodiment thereof.

Fig. 2 is a rear elevation.

Fig. 3 is a side elevation.

Fig. 4 is a sectional view on the line 4—4 of Fig. 2.

Fig. 5 is a sectional view illustrating a modified construction.

Fig. 6 is a sectional view illustrating another modified embodiment.

In the embodiment illustrated in Figs. 1 to 4 the device includes a support in the form of a case having a wall 1 to which is attached a lamp socket 2 in circuit with wires 3 leading to an appropriate source of electrical energy mounted on the automobile. The lamp 4 is removably connected to the socket and may be maintained in a condition of illumination or not as desired by any usual switch device for controlling the circuit. The case also comprises diverging side walls 5 and diverging top and bottom walls 6 integrally connected with each other and with the wall 1. The several walls having this form constitute reflectors for the lamp so that the illumination is properly reflected to the tail light plate and to the license plate. The top wall 6 is arched intermediate of its ends and the top, bottom and side walls are integrally connected with a wall member 7. The tail light plate 8 is mounted in an appropriate frame 9 in the raised portion of the wall member 7 adjacent to the top wall of the case, so that the lamp will illuminate the plate, the light being properly and efficiently reflected by the reflecting walls of the case.

A frame is formed in the opening within the wall part 7 by spaced flanges 10 at the edges of the opening. Within the frame thus formed the license plate 11 is supported. The license plate consists of an opaque non-combustible plate having translucent spaces 12 designating the sovereignty issuing the license and the year in which the license is issued, and also having translucent spaces 13 in the form of numerals constituting the license number. These translucent spaces or portions are integral with the plate which is preferably composed of material possessing sufficient resiliency to conform properly to any variations in the frame in which it is mounted without breaking. A material which I have found especially appropriate for this purpose is non-combustible celluloid formed in opaque sheets or plates which are inherently infrangible and resilient and which are provided with the integral translucent spaces 12 and 13 illuminated by the lamp within the case, the illumination of which is strengthened by the reflecting walls. The sheet with the translucent portions forming the license number may be obtained by leaving the desired portions translucent and the remainder of the sheet opaque, in making the sheet. It is preferable that the plate be removable from the frame 10 in which it is carried and it may be retained in the frame by an appropriate retaining device such as illustrated in Figs. 1, 2 and 3 and comprising a member 14 pivoted to one of the walls of the case and having an arm extending against or adjacent to the open end of the frame in which the plate is mounted. The latch member may be held in position to retain the plate within the frame by a convex projection 15 on the plate seating within a recess in the wall of the case. Obviously, a resilient latch device of this character may be conveniently released to enable the plate to be removed or replaced and when latched will remain in position to prevent accidental displacement of the plate.

In Fig. 5 I have illustrated a modified construction of the device in which the case and the lamp are of the same construction as that illustrated in Figs. 1 to 4 and said parts have the same reference numerals applied thereto. The modified construction illustrated in Fig. 5 has reference to the license plate and its accessories by which it is retained within the case. The license plate 11 in this modification is preferably of the same construction as that previously described, but is protected from the heat of the lamp by a glass plate 16 mounted in the case between the license plate and the lamp and spaced a short distance away from the license plate. In the form illustrated the license plate and the glass plate 16 are both mounted in a frame 17 removably positioned in the opening in the wall 7 and retained therein by a latch device similar to the latch device 14—15 previously described, or other appropriate retaining device. The space between the license plate and the protecting glass plate 16 may be in communication with the atmosphere if desired so that said space will constitute a passage for currents of air and thus the license plate will at all times be protected from the heat of the lamp.

The modification illustrated in Fig. 6 consists in placing a glass plate 18 in an oblique position between the lamp and the license plate, so that the lower edge of the glass plate is retained by flanges 19 on the lower wall of the case, and the upper edge of the plate which is adjacent to the license plate 11 is retained by a suitable frame 20. In this construction the side walls of the case are formed with a series of openings 21 through which the air may circulate in order to prevent the license plate from becoming heated.

It is probable that other modifications will suggest themselves to those familiar with the requirements of these devices, but further illustration is deemed unnecessary, since such modifications as may be within the scope of the appended claims are the complete equivalent of the invention as illustrated.

What I desire to secure by Letters Patent is:—

A combined license plate and tail light, comprising a support, illuminating means carried by the support, walls diverging from the upper and lower sides of said support above and below the illuminating means, a tail light plate supported between said walls served by the illuminating means, a frame removably supported by said walls below the tail light plate, an infrangible resilient license plate composed of a sheet of non-metallic opaque material having translucent portions forming the license number supported in said frame in vertical alinement with the tail light plate and in position to be served by the illuminating means, and a transparent protecting plate supported in said frame between the license plate and the illuminating means.

In witness whereof, I have signed this specification in the presence of two subscribing witnesses.

WILLIAM F. OTHER.

Witnesses:
    JOHN D. RIPPEY,
    N. G. BUTLER.